Dec. 29, 1931.  F. G. MARCIANO  1,838,775
EYEGLASS FRAME
Filed Oct. 18, 1929
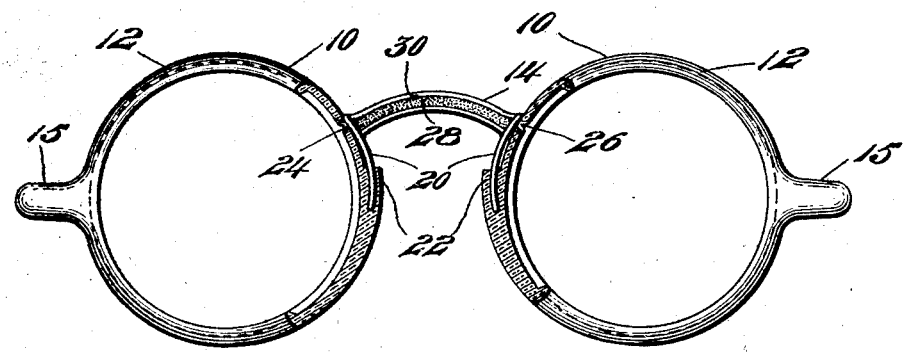
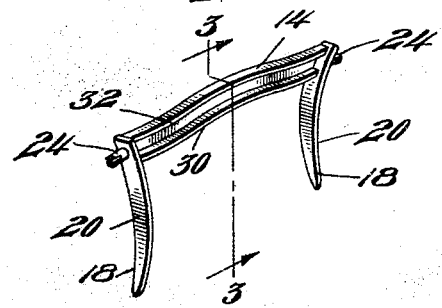
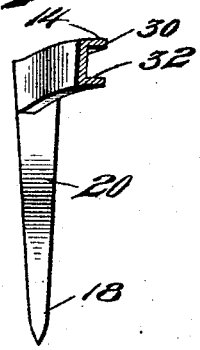
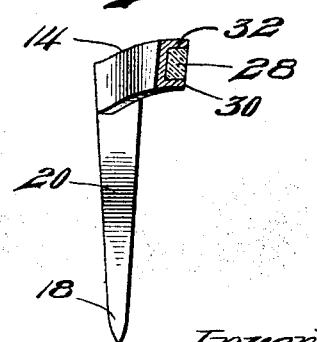
Inventor
Frank G. Marciano
By Thomas A. Jenkins Jr.
Attorney Patented Dec. 29, 1931

1,838,775

UNITED STATES PATENT OFFICE

FRANK G. MARCIANO, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

EYEGLASS FRAME

Application filed October 18, 1929. Serial No. 400,644.

My invention relates to eye glass frames adapted to be used either as eye glasses per se or as spectacles with the addition of temples thereto.

An object of my invention is to provide an eye glass frame of more pleasing construction than hitherto. To this end I embed or otherwise affix preferably enamel ornamentation preferably of a different color than the bridge member on the front wall of said bridge member. While this may be done in any suitable manner I preferably embed the enamel ornamentation in a groove formed in the front wall of said bridge member. I also preferably employ composition eye glass holding rims and a metallic bridge member having the ends thereof embedded into said rims provided with a groove in the front wall thereof and enamel ornamentation contained within said groove, the combination of the composition rims which may be made in different colors in contrast to the metallic rim having enamel ornamentation inserted on the front wall thereof forming a very pleasing and neat appearing frame.

These and such other objects of my invention as may hereinafter appear will be best understood from a description of an embodiment thereof, such as is shown in the accompanying drawings.

In the drawings, Fig. 1 is a front elevation of an eye glass frame constructed in accordance with my invention partially shown in section.

Fig. 2 is a perspective view of a metallic bridge member preferably employed therein, provided with a groove on the front wall thereof adapted to receive the enamel or other type of ornamentation employed.

Fig. 3 is a sectional view of the bridge member taken along the line 3—3 shown in Fig. 2.

Fig. 4 is a sectional view of a bridge member similar to Fig. 3, but with enamel embedded in the groove thereof.

In the drawings, wherein like characters of reference indicate like parts throughout, 10 generally indicates an eye glass frame constructed in accordance with the teachings of my invention. While any type of an eye glass frame may be employed I preferably provide eye glass holding rims 12 made out of a composition material. I employ the word "composition" broadly to include all types of shell, celluloid, phenol condensation products, xylonite and other similar composition products. I also preferably provide a preferably metallic bridge member 14 of the desired shape having the ends thereof embedded into said rims 12. In the embodiment shown the bridge member 14 preferably has the lower ends 18 of the downwardly projecting portions 20 thereof embedded into the nose engaging enlargements 22 of the composition frame and also additionally has the projection 24 near the top of the downwardly projecting portions 20 thereof additionally embedded through said composition rims 12 and having the projections 24 thereof split and/or upset as at 26 to more firmly bind said bridge member to said composition rims 12 at a plurality of points. Said preferably metallic bridge member 14 is provided with ornamentation 28 preferably enamel ornamentation on the front wall 30 thereof. While the enamel or other ornamentation may be affixed to the front wall of said bridge member in any suitable manner, I preferably provide the groove 32 for receiving the enamel or other ornamentation therein. Said groove may be formed on the front wall 30 of the bridge member in any suitable manner. Where a metallic bridge member is employed said groove 32 may be placed in said bridge member 14 after said bridge member is formed by a pressing operation or may, if desired, be cast therein if said bridge member be made by casting. After the bridge member has been formed the enamel or other ornamentation 28 is suitably embedded in said groove 32 by inlaying the preferably hot enamel therein in any well known manner and allowing it to set therein. As shown in the drawings, the rims 12 are preferably provided with the projections 15 for the attachment of spectacle temples thereto, but it is obvious that if desired my frame may be employed as an eye glass frame without the addition of temples. It is thus obvious that I have provided an eye glass frame of more pleasing appearance than any hitherto constructed.

It is understood that my invention is not limited to the specific embodiment shown and that various deviations may be made therefrom without departing from the spirit and scope of the appended claims.

What I claim is:

1. In combination, composition eyeglass holding rims, a metallic bridge member having the ends thereof attached to said rims, having a groove of substantially the contour of and of lesser height than said bridge member in the front wall thereof and enamel ornamentation of a different color than the exposed top and bottom front edges of said bridge member and said composition rims contained within said groove.

2. In combination, eyeglass holding rims, a metallic bridge member having the ends thereof attached to said rims, having a groove of substantially the contour of and of lesser height than said bridge member in the front wall thereof and enamel ornamentation of a different color than the exposed top and bottom front edges of said bridge member contained within said groove.

In testimony whereof I affix my signature.

FRANK G. MARCIANO.